(12) United States Patent
Hallum

(10) Patent No.: US 9,671,291 B2
(45) Date of Patent: Jun. 6, 2017

(54) NON-CONTACT TEMPERATURE MEASUREMENT IN MOLTEN METAL APPLICATIONS

(71) Applicant: CCPI Inc., Blanchester, OH (US)

(72) Inventor: Gary W. Hallum, Mason, OH (US)

(73) Assignee: CCPI Inc., Blanchester, OH (US)

( * ) Notice: Subject to any disclaimer, the term of this patent is extended or adjusted under 35 U.S.C. 154(b) by 250 days.

(21) Appl. No.: 14/534,600

(22) Filed: Nov. 6, 2014

(65) Prior Publication Data

US 2015/0130119 A1    May 14, 2015

Related U.S. Application Data

(60) Provisional application No. 61/901,557, filed on Nov. 8, 2013.

(51) Int. Cl.
*B22D 41/00* (2006.01)
*G01J 5/08* (2006.01)
(Continued)

(52) U.S. Cl.
CPC ............ *G01J 5/0875* (2013.01); *B22D 41/00* (2013.01); *F27D 21/0014* (2013.01); *G01J 5/004* (2013.01); *G01J 5/08* (2013.01); *G01J 5/0818* (2013.01); *G01J 5/0887* (2013.01); *G01K 13/02* (2013.01); *G01J 5/046* (2013.01); *G01J 5/048* (2013.01); *G01K 2013/026* (2013.01)

(58) Field of Classification Search
CPC ........................................................ F27D 21/00
USPC ............................................ 266/99, 100, 225
See application file for complete search history.

(56) References Cited

U.S. PATENT DOCUMENTS

| 4,444,516 A | 4/1984 | Dostoomian et al. |
| 4,721,533 A | 1/1988 | Phillippi et al. |
| (Continued) | | |

FOREIGN PATENT DOCUMENTS

EP    0275059 A2 *  7/1988  ............ G01J 5/0037

OTHER PUBLICATIONS

"Non-contact temperature measurement of molten metal" [online]. Keller HCW GmbH, Jun. 27, 2013. Retrieved from the Internet: <URL: http://www.keller-msr.es/application/non-contact-temperature-measurement-of-molten-metal.php>. pp. 1-4.
(Continued)

*Primary Examiner* — Scott Kastler
(74) *Attorney, Agent, or Firm* — Dinsmore & Shohl LLP

(57) ABSTRACT

A device to measure a temperature of molten metal may include an infrared sensor effective to measure the temperature of the molten metal, a sheath having an open end, a sealed end, and a channel extending from the open end to the sealed end, and an infrared-transparent window disposed between the infrared sensor and the channel of the sheath. The open end of the sheath is disposed near the infrared sensor and the sealed end of the sheath extends into the molten metal. The infrared-transparent window or rod is disposed between the infrared sensor and the channel of the sheath such that the infrared sensor can measure the temperature through the infrared-transparent window or rod, the channel, and the sealed end. The infrared-transparent window or rod seals the infrared sensor from the channel in the sheath.

19 Claims, 5 Drawing Sheets

(51) Int. Cl.
    *F27D 21/00*    (2006.01)
    *G01K 13/02*    (2006.01)
    *G01J 5/00*    (2006.01)
    *G01J 5/04*    (2006.01)

(56) References Cited

U.S. PATENT DOCUMENTS

| | | |
|---|---|---|
| 5,302,027 A | 4/1994 | Park |
| 5,404,931 A | 4/1995 | Anzai et al. |
| 7,445,384 B2 | 11/2008 | Van Der Maat et al. |
| 8,431,878 B2 | 4/2013 | Dunn |
| 2004/0047395 A1 | 3/2004 | Xie et al. |
| 2015/0130119 A1* | 5/2015 | Hallum ................ G01J 5/0875 266/99 |

OTHER PUBLICATIONS

Foundry, "Liquid Metal Temperature Measurement System" [online]. Land Instruments, 2013. Retrieved from the Internet: <URL: http://www.landinst.nl/applications/foundry/>. pp. 1-2.

"PYRO Optical pyrometer" [online]. The Pyrometer Instrument Company, Inc., 2013. Retrieved from the Internet: <URL: http://www.pyrometer.com/Pyro_Optical.html>. pp. 1-4.

Invitation to Pay Additional Fees & Partial International Search Report mailed Feb. 25, 2015 relating to International Patent Application No. PCT/US2014/064478 filed Nov. 7, 2014.

International Search Report & Written Opinion relating to PCT/US2014/064478 filed Nov. 7, 2014; Mail Date: May 4, 2015.

* cited by examiner

NON-CONTACT TEMPERATURE MEASUREMENT IN MOLTEN METAL APPLICATIONS

CROSS-REFERENCE TO RELATED APPLICATIONS

This application claims the benefit of U.S. Provisional Application Ser. No. 61/901,557 filed on Nov. 8, 2013, which is hereby incorporated by reference in its entirety.

FIELD

This disclosure relates generally to temperature measurement, and more particularly, non-contact temperature measurement in molten metal applications.

TECHNICAL BACKGROUND

In metal casting, molten metal is passed through various metallurgical vessels before flowing into a casting mold, where it is solidified. These vessels may be used to allow the continuous sequencing of metal, control the delivery rate and improve the quality of the metal. One of the necessary requirements needed for successful casting of metal is the need to know the temperature of the metal during casting.

There are several conventional techniques for measuring the temperature of the molten metal within various metallurgical vessels in the casting process. In some of these techniques, a temperature probe extends through the wall of the vessel below the surface of the molten metal. The probe includes a platinum-based thermocouple that extends into the molten metal within the vessel. An alumina graphite sheath covers the thermocouple. The thermocouple sends an electrical signal indicative of the temperature reading through an electrical connection to a controller that records the temperature and provides information to an operator. The entire probe assembly is discarded after use, including the platinum thermocouple, leading to a significant cost and waste of platinum. Accordingly, there is a need for alternative temperature probes, portions of which may be reused, thereby lowering costs and reducing waste.

SUMMARY

According to one embodiment, a device to measure a temperature of molten metal includes an infrared sensor effective to measure the temperature of the molten metal, a sheath having an open end, a sealed end, and a channel extending from the open end to the sealed end, and an infrared-transparent window disposed between the infrared sensor and the channel of the sheath. The open end of the sheath is disposed near the infrared sensor and the sealed end of the sheath extends into the molten metal. The infrared-transparent window is disposed between the infrared sensor and the channel of the sheath such that the infrared sensor can measure the temperature through the infrared-transparent window, the channel, and the sealed end. The infrared-transparent window seals the infrared sensor from the channel in the sheath. Thus, the window may prevent molten metal leakage in the event of the failure of the alumina-graphite sheath.

In another embodiment, the infrared-transparent window may be in the form of an infrared-transparent rod. The infrared-transparent rod extends through the channel of the sheath from the open end to the sealed end. The infrared-transparent rod additionally seals the infrared sensor from the channel in the sheath.

According to another embodiment, a vessel for molten metal includes a first opening for receiving molten metal into the vessel; a second opening for disbursing molten metal out of the vessel; a wall positioned between the first opening and the second opening, the wall including an aperture positioned near the second opening; and a device positioned through the aperture in the wall. The device includes an infrared sensor; an alumina-graphite sheath having a sealed end, an open end, and a channel extending from the open end to the sealed end, the open end being disposed near the infrared sensor and the sealed end extending into the molten metal; and an infrared-transparent oxide rod, such as fused silica, extending from the open end toward the sealed end of the sheath inside the channel. The infrared-transparent oxide rod seals the infrared sensor from the channel of the sheath.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
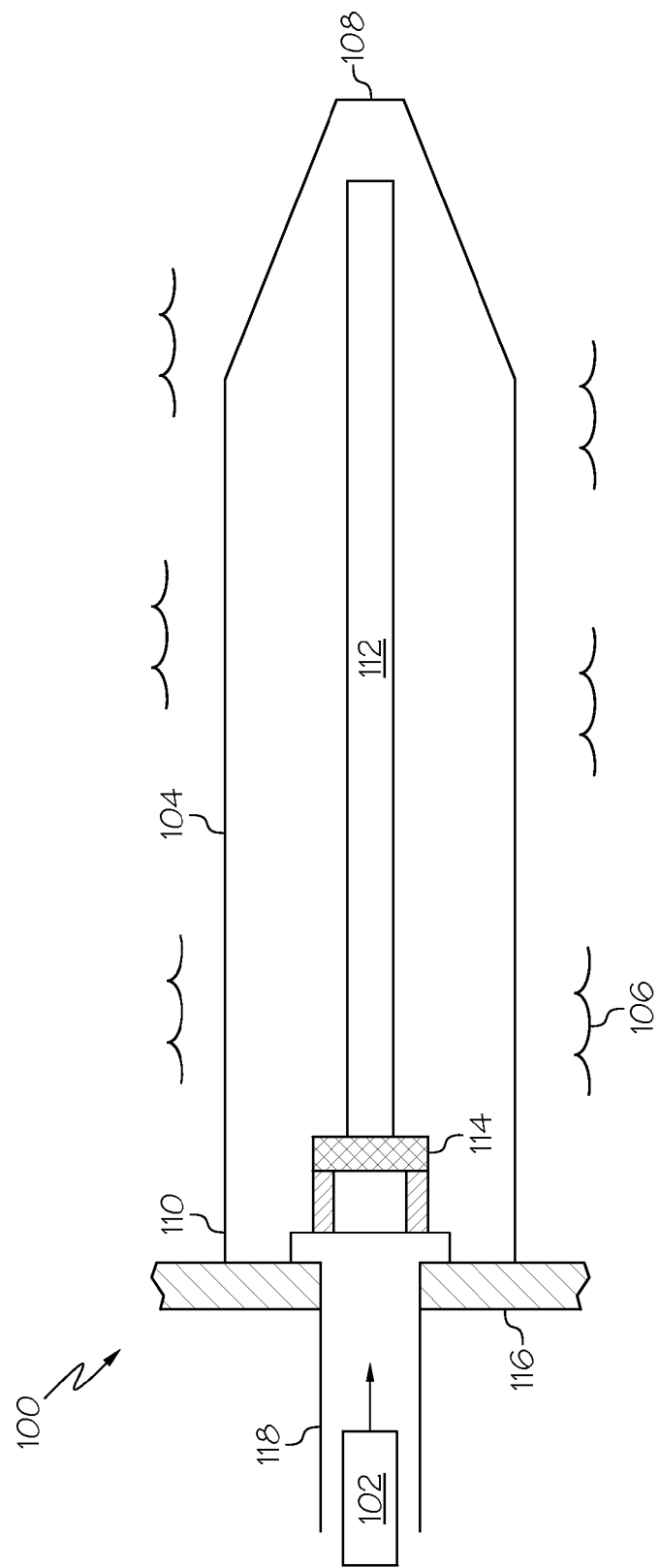
FIG. 1 schematically depicts a temperature probe including an IR-transparent refractory window according to one or more embodiments.

Reference will now be made in detail to various embodiments, examples of which are illustrated in the accompanying drawings. Whenever possible, the same reference numerals will be used throughout the drawings and specification to refer to the same or like parts. One embodiment of the temperature probe is shown in FIG. 1, and is designated generally throughout by the reference numeral 100.

As shown in FIG. 1, temperature probe 100 includes an infrared (IR) sensor 102 affixed to a sheath 104. The IR sensor 102 may be capable of measuring temperatures of up to approximately 1705° C., withstanding ambient temperatures of up to approximately 316° C., and sensing wavelengths of electromagnetic radiation associated with molten metal 106. In various embodiments, the IR sensor 102 transfers temperature information via fiber optic cables or other cables to electronics (not shown) located separate from the temperature probe 100. As used herein, "temperature information" may include IR radiation information obtained by a detector, a generated electrical signal proportional to the temperature of the radiation, an amplified and/or transformed output signal proportional to the temperature of the molten metal 106, and/or a measuring value corresponding to the temperature of the molten metal 106. An example of such an IR sensor is commercially available from Raytek as Marathon FR Series. In some embodiments, the cables (electrical or optical) to the electronics may include a quick-release feature that enables the cables to break away from the temperature probe 100 without causing damage. Such a feature may prevent damage to the temperature probe 100 and/or the electronics in the event that a force is applied to the cables.

The electronics may include a microcontroller, a computer, or another computing device that operates to transform the temperature information transferred by the IR sensor 102 into information that may be comprehended by an operator. For example, the temperature probe 100 may provide temperature information in the form of an electrical or optical signal that is proportional to the radiation emitted from the molten metal 106 to a computer that transforms the electrical or optical signal into an output signal that is proportional to the temperature of the molten metal 106. The computer may transfer the output signal as an analog or digital output signal to other computing systems or processes, and/or cause the output signal to be displayed on a display device to the operator. The temperature information may be displayed with or without other various types of information to the operator. For example, the computer may provide temperature information from the temperature probe 100 along with information obtained from additional probes or input devices, and may enable the operator to control the temperature within the vessel, the flow of the molten metal 106 into and out of the vessel, and the like. The electronics may be located in the same room as the vessel and temperature probe 100, or may be located remotely from the vessel and temperature probe 100 in order to provide greater protection from the high temperatures that can be damaging to the electronics. In some embodiments, the electronics connected to the IR sensor 102 may receive information from the IR sensor 102 via wires, and may transmit the information wirelessly or via wires to another computing device.

Still referring to FIG. 1, the sheath 104 has a sealed end 108, an open end 110, and a channel 112 extending the length of the sheath 104 from the open end 110 to the sealed end 108. The sheath 104 may be made of alumina-graphite, silica, zirconia-graphite, silicon alumina nitride (SiAlON), other refractory materials, or a mixture thereof. In some embodiments, other types of refractory materials may be used. The material from which the sheath 104 is made may be selected depending on the particular application. For example, for steel or iron melts, the sheath 104 may be made of alumina-graphite, while for molten aluminum, the sheath 104 may be made of alumina-graphite, alumina or magnesia based castable, silica, zirconia-graphite, or SiAlON. The sheath 104 may have a length from about 45 cm to about 61 cm, although in some embodiments, the length of the sheath may be less than about 45 cm. However, it should be understood that the length of the sheath may be adjusted depending on the specific application.

At the open end 110, the sheath 104 includes an IR-transparent refractory window 114. As used herein, the term "IR-transparent" means that the window 114 is transparent to wavelengths of electromagnetic radiation in the IR range of the spectrum. In various embodiments, an IR-transparent material is above about 95% transparent to wavelengths from about 1 µm to about 5 µm. In some embodiments, the IR-transparent material is above 95% transparent to wavelengths of about 1 µm. In various embodiments, the IR-transparent refractory window 114 has a low reflectivity (e.g., less than about 20%), is stable at temperatures of up to about 350° C., and is able to withstand the temperature of the molten metal 106 for at least about 30 minutes. For example, the IR-transparent refractory window 114 may be made of alumina, sapphire, $Y_2O_3$, MgO, transparent spinel, aluminum oxynitride, fused silica, fused quartz, another oxide, a transparent ceramic such as Perlucor (commercially available from CeramTec GmbH, Plochingen, Germany), or a combination thereof. The IR-transparent refractory window 114 is positioned near the open end 110 of the sheath 104 between the IR sensor 102 and the channel 112 such that the IR sensor 102 can detect a temperature at the sealed end 108 of the sheath 104 through the IR-transparent refractory window 114. The IR-transparent refractory window 114 may be from about 3 mm to about 12 mm in thickness or greater, depending on the particular embodiment. In some embodiments, the IR-transparent refractory window 114 may be less than about 5 mm in thickness or between about 3 mm and about 5 mm in thickness.

Figure 2:
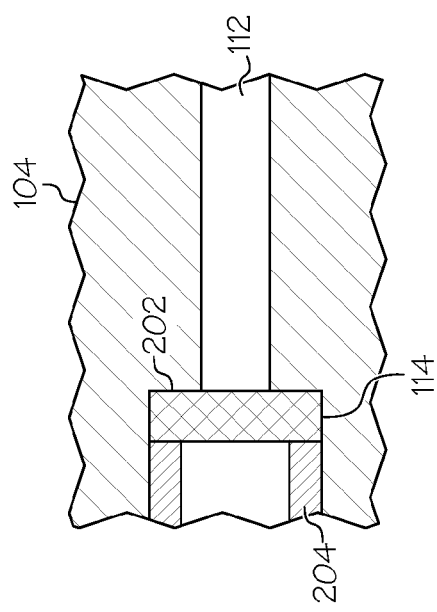
FIG. 2 is a detail view of a temperature probe including an IR-transparent refractory window that functions as a seal according to one or more embodiments.

In various embodiments, the IR-transparent refractory window 114 seals the IR sensor 102 from the channel 112 effective to prevent the molten metal 106 from leaking out the open end 110 of the sheath 104 and protect the IR sensor 102. As shown in FIG. 2, the IR-transparent refractory window 114 may be fitted up against a seat 202 in the sheath 104. A metal tube 204 may also be used to hold the IR-transparent refractory window 114 in place. For example, the metal tube 204 may be mortared into the open end 110 of the sheath 104 against the IR-transparent refractory window 114. Various other methods of fixing the IR-transparent refractory window 114 within the sheath 104 are contemplated, and may be used depending on the particular embodiment and/or application.

In various embodiments, the sheath 104 is inserted into the molten metal 106 via an aperture in a wall 116 of the vessel. The sheath 104 may be inserted below the top surface of the molten metal 106 in order to obtain a temperature measurement that corresponds to a temperature of the molten metal 106 near an outlet valve of the vessel. Accordingly, the temperature probe 100 may include one or more sealing features configured to prevent the molten metal 106 from leaking out of the aperture around the temperature probe 100.

A seal may be provided, for example, around the sheath 104 to which the IR sensor 102 and a metal assembly 118 are connected. Although the sheath 104 may be sized to precisely fit through the aperture in the wall 116, a refractory sealant may be provided around the inside surface of the aperture and around the sheath 104 in order to more completely seal off the opening. In some embodiments, the sheath 104 may fit into a seating on the interior and/or exterior of the wall 116.

In various embodiments, the IR-transparent refractory window 114 may function as a seal, preventing the molten metal 106 from leaking out of the vessel in the event that the sheath 104 breaks. For example, the metal tube 204 and the seat 202 may enable the IR-transparent refractory window 114 to completely seal off the open end 110 of the sheath 104 from the channel 112. Thus, if the sheath 104 were to break, any of the molten metal 106 flowing into the channel 112 would be prevented from leaving the vessel via the open end 110 of the sheath 104.

Figure 3:
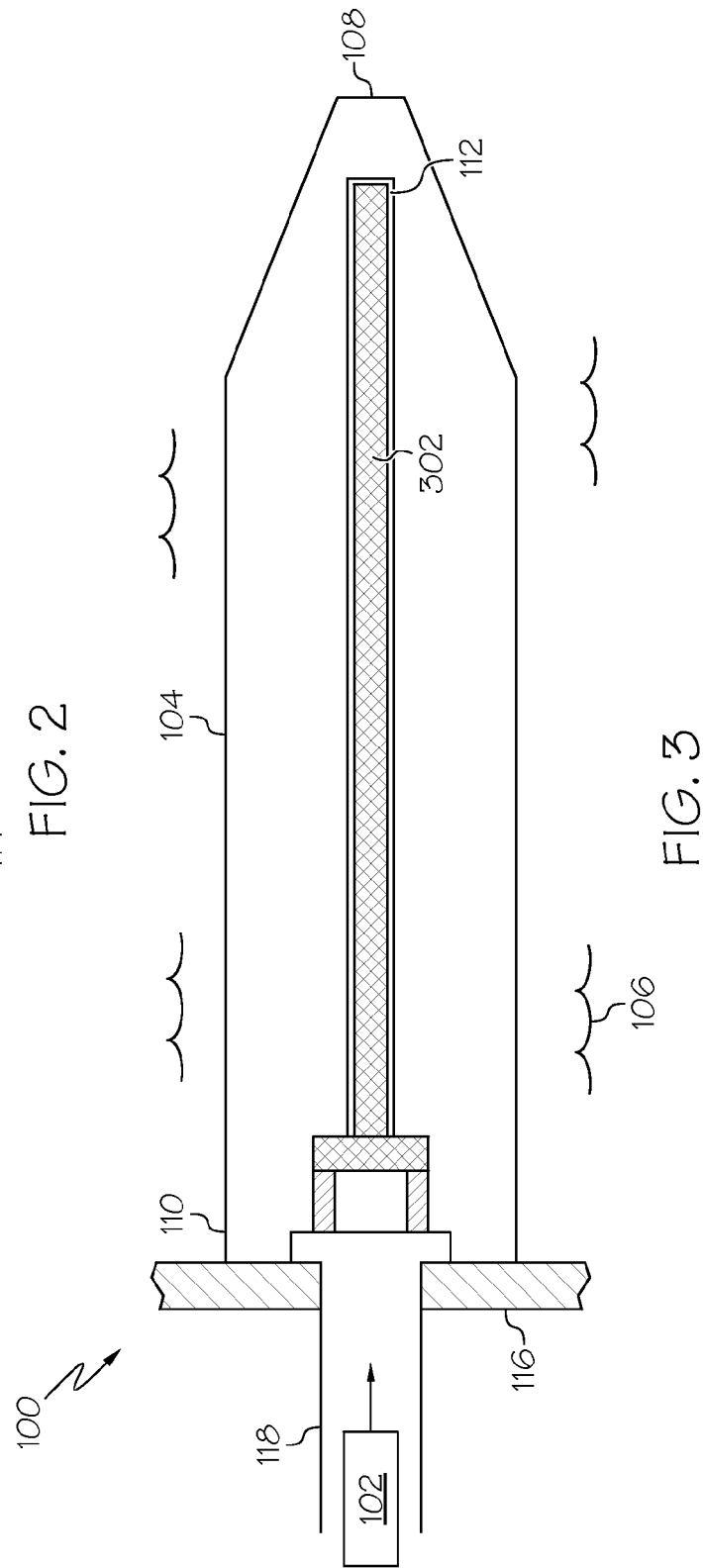
FIG. 3 schematically depicts a temperature probe including an IR-transparent oxide rod according to one or more embodiments.

FIG. 3 schematically illustrates an embodiment in which the temperature probe 100 includes an IR-transparent oxide rod 302 rather than the IR-transparent refractory window 114. Similar to the IR-transparent refractory window 114, the IR-transparent oxide rod 302 may be made from alumina, sapphire, $Y_2O_3$, MgO, fused silica, fused quartz, another oxide, or a combination thereof. In various embodiments, the IR-transparent oxide rod 302 may be made of solid fused silica or fused quartz. Although the IR-transparent oxide rod 302 may be made of a variety of materials, in various embodiments, the IR-transparent oxide rod 302 has a transmittance of at least about 95% for wavelengths of about 1000 nm over a length of about 10 mm. In some embodiments, the IR-transparent oxide rod 302 has a transmittance of at least about 95% for wavelengths of about 1000 nm over the length of the IR-transparent oxide rod 302.

The IR-transparent oxide rod 302 may extend from the open end 110 to the sealed end 108 of the sheath 104 inside the channel 112. The length of the IR-transparent oxide rod 302 may be about 46 cm or less and may vary depending on the particular embodiment. For example, in some embodiments, the IR-transparent oxide rod 302 has a length less than or equal to a length of the channel 112. In some embodiments, the length of the IR-transparent oxide rod 302 is less than or equal to about ¾ of the length of the channel 112. In various embodiments, the IR-transparent oxide rod 302 may have a diameter d of from about 0.5 mm to about 12 mm.

Figure 4:
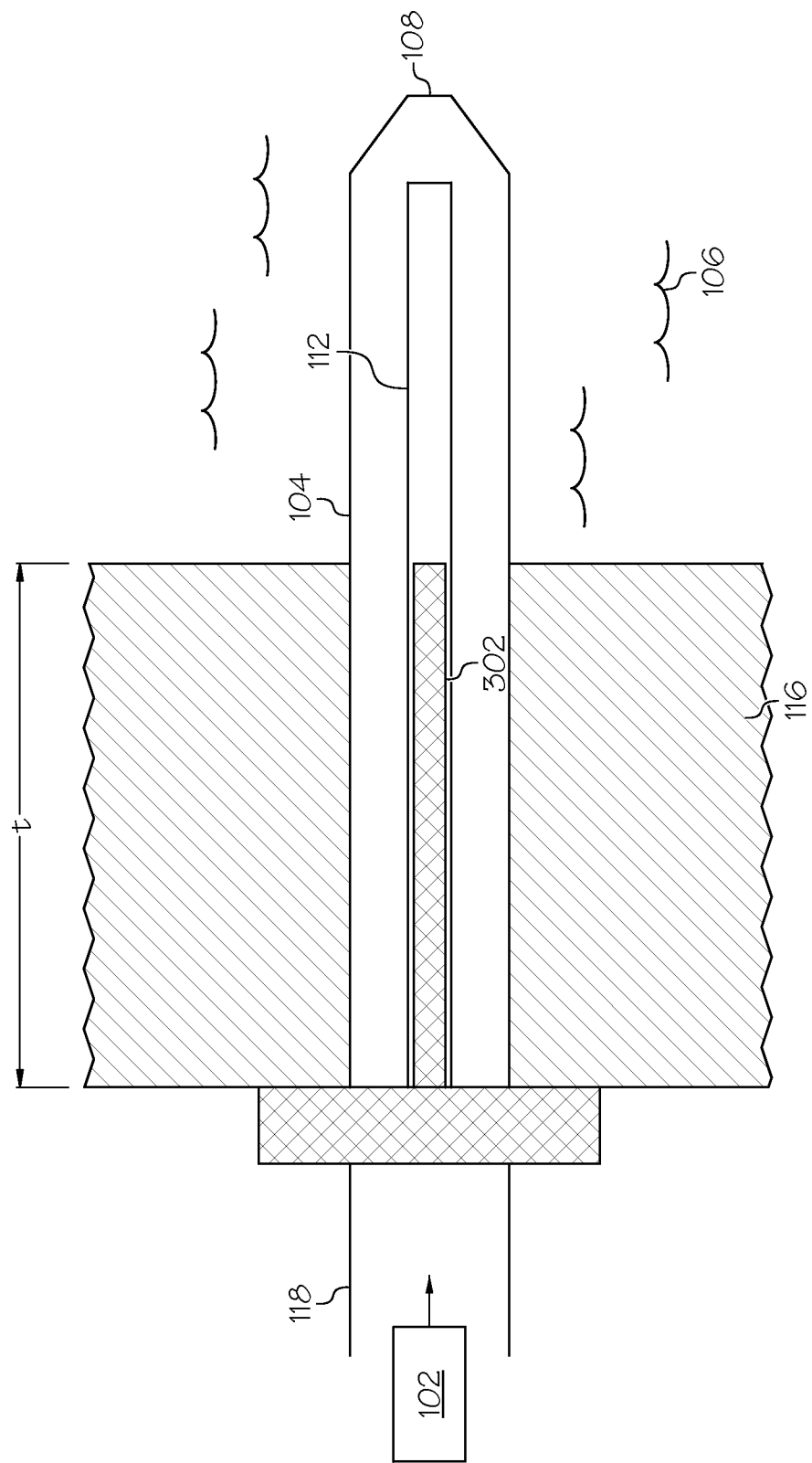
FIG. 4 schematically depicts another temperature probe including an IR-transparent oxide rod according to one or more embodiments.

In various embodiments, such as when the molten metal is steel, the IR-transparent oxide rod 302 has a length such that it does not extend into the molten steel. As shown in FIG. 4, the vessel wall 116 has a thickness t between an outside surface 402 and a working lining surface 404, and the IR-transparent oxide rod 302 extends from the outside surface 402 of the wall 116 to the working lining surface 404 a length equal to the thickness t of the wall 116. Accordingly, the IR-transparent oxide rod 302 does not extend past the working lining surface 404 of the vessel when the device is positioned in an aperture through the wall 116 of the vessel. This may protect the IR-transparent oxide rod 302 from the extreme temperatures of the molten steel. However, in other embodiments, such as embodiments in which the molten metal is non-ferrous, the IR-transparent oxide rod 302 may extend to the end of the channel 112 proximate the sealed end of the sheath, past the working lining surface 404 of the wall 116.

One or both ends of the IR-transparent oxide rod 302 may be optically polished in various embodiments. The polishing may be performed according to any suitable means, including, but not limited to, mechanical polishing or fire polishing.

In various embodiments, the IR-transparent oxide rod 302 may seal the IR sensor 102 from the channel 112 of the sheath 104 to prevent the molten metal 106 from leaking from open end 110 of the sheath 104 in the event that the sheath 104 breaks. For example, the IR-transparent oxide rod 302 can be seated similarly to the IR-transparent refractory window 114 shown in FIG. 2 in order to seal off the open end 110 of the sheath 104.

Figure 5:
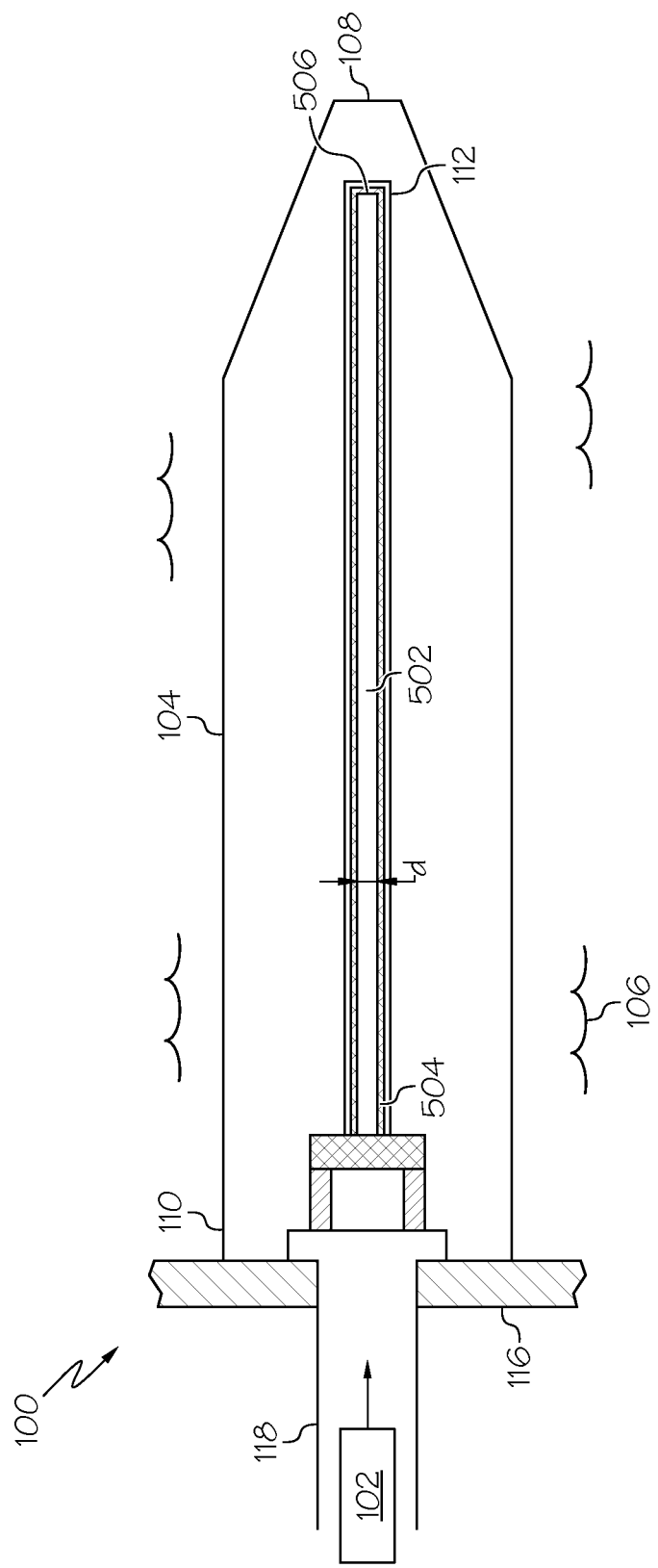
FIG. 5 schematically depicts a temperature probe including an IR-transparent refractory window and a tube according to one or more embodiments.

FIG. 5 schematically illustrates an embodiment in which a tube 502 is positioned within and extends the length of the channel 112 in the sheath 104. In some embodiments, the tube 502 extends from the end of the channel 112 proximate the sealed end of the sheath to the open end of the sheath. The tube 502 may be, for example, a mullite or alumina tube with an open end 504 at or near the IR-transparent refractory window 114 and a closed end 506 near the closed end 108 of the sheath 104. The inside diameter d of the tube 502 should be of sufficient size for accurately measuring the temperature at the closed end 506 of the tube 502 by the IR sensor 102. In various embodiments, the tube 502 may prevent gases from the sheath 104 from interfering with the IR sensor's 102 ability to monitor the temperature at the closed end 506 of the tube 402.

In various embodiments including the tube 502, the IR-transparent refractory window 114 seals the IR sensor 102 from the tube 502. Thus, the IR-transparent refractory window 114 may function as a seal, preventing the molten metal 106 from leaking out of the vessel in the event that the sheath 104 and the tube 502 break. For example, the metal tube 204 and the seat 202 may enable the IR-transparent refractory window 114 to completely seal off the open end 504 of the tube 502. Thus, if the tube 502 were to break, any of the molten metal 106 flowing into the tube 502 would be prevented from leaving the vessel via the open end 504 of the tube 504.

In some embodiments, the tube 502 may be employed in a device that also includes an IR-transparent oxide rod 302, as described above. In some such embodiments, the tube 502 has a length that is less than or equal to the length of the channel 112. For example, in some embodiments, the tube 502 extends from the end of the channel 112 proximate the sealed end of the sheath toward the open end of the sheath, but does not extend the entire length of the channel 112. In some embodiments, the tube 502 extends ¼, ½, or ¾ of the length of the channel 112 such that the tube 502 does not extend through a portion of the channel 112 proximate the open end of the sheath. In various embodiments, at least a portion of the channel 112 includes both the tube 502 and the IR-transparent oxide rod 302.

In the embodiments described herein, the IR sensor 102 is removably attached to the sheath 104 such that the IR sensor 102 may be readily removed and reused. For example, the IR sensor 102 may be reused for multiple metallurgical vessel cycles. The shroud 104, the IR-transparent refractory window 114 or the IR-transparent oxide rode 302, and/or the metal assembly 118 may be dissociated with the IR sensor 102 and disposed of at the end of each cycle. Thus, at least a portion of the temperature probe 100 may be recycled, reducing the waste generated during the cycle, as well as providing cost savings. In various embodiments, the temperature probe 100 may be replaced approximately every 36 hours of run time or when the IR-transparent oxide rod has been exposed to temperatures of greater than about 1300° C. for approximately 36 hours. However, the temperature probe 100, and in particular, the sheath and IR-transparent oxide rod may be replaced more or less frequently depending on the particular application and/or materials employed.

When a portion of the temperature probe 100 is replaced, proper alignment of the replaced portion of the temperature probe 100 enables the IR sensor 102 to function in conjunction with the replaced portion to accurately measure a temperature of molten metal. To facilitate proper alignment of the various components of the temperature probe 100, in various embodiments, the tube 502 is sized to fit tightly within the channel 112 of the sheath 104, and the IR-transparent oxide rod 302 is sized to fit tightly within the tube 502. In embodiments in which a tube 502 is not employed, the IR-transparent oxide rod 302 may be sized to fit tightly within the channel 112 of the sheath 104. A "tight fit" ensures that the tube 502 and/or IR-transparent oxide rod 302 may be readily inserted into the channel 112, but are substantially fixed in place within the channel 112 once inserted. The IR sensor 102 may also fit tightly within the metal assembly 118 such that when the IR sensor 102 and the metal assembly 118 are connected to the sheath, the IR sensor 102 is directly aligned with the IR-transparent oxide rod 302 and the channel 112. The specific tolerances and acceptable variances of the alignment of the IR sensor 102 may vary depending on the materials employed and the capabilities of the IR sensor 102.

Figure 6:
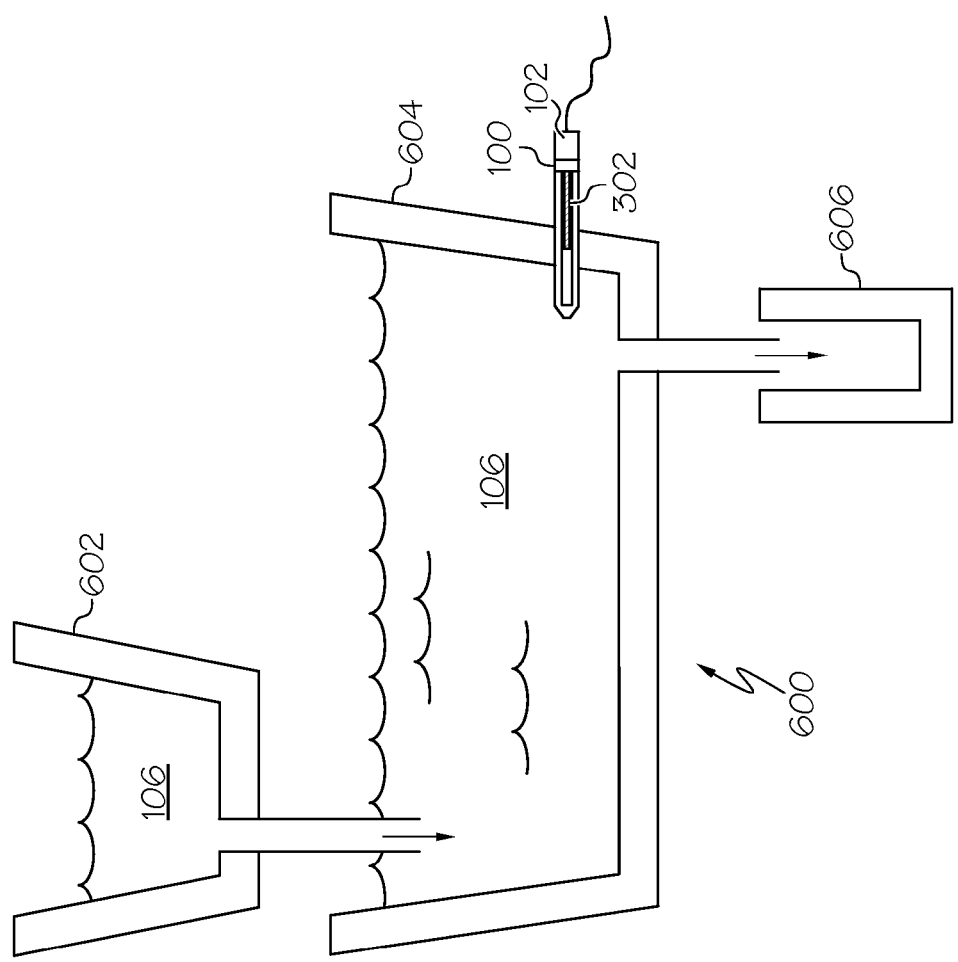
FIG. 6 schematically depicts a temperature probe positioned within a metallurgical vessel according to one or more embodiments.

Turning now to FIG. 6, an example environment 600 is illustrated including a temperature probe 100. Within the environment 600 shown in FIG. 6, molten metal 106 is tapped into a ladle 602 from one or more furnaces (not shown). Within the ladle 602, the molten metal may be subjected to one or more treatments, such as alloying and/or degassing, and the temperature of the molten metal may be adjusted to the appropriate temperature for the application. From the ladle 602, the molten metal 106 is transferred via a pipe to a tundish 604 which stores the molten metal 106. The tundish 604 includes a first opening for receiving molten metal and a second opening for disbursing the molten metal from the tundish 604. At least one wall between the first and second openings retains the molten metal within the tundish 604 such that the tundish 604 may store the molten metal for a period of time. Accordingly, the tundish 604 enables molten metal 106 to be continuously fed to a casting machine 606 while ladles are switched. The tundish 604 also acts as a buffer of molten metal, can smooth out flow of the molten metal, and regulate the feed of the molten metal to the casting machine 606. The molten metal 106 is drained from the tundish 604 into the casting machine 606 via the second opening. The casting machine 606 includes at least one mold for solidifying the molten metal.

As shown in FIG. 6, the temperature probe 100 as described hereinabove can be positioned near the outlet of the tundish 604. For example, the temperature probe 100 can be positioned in an aperture through the wall of the tundish 604 near the outlet from the tundish 604 to the casting machine 606. In some embodiments, a temperature probe can be positioned within the ladle 602 as an alternative to, or in addition to, the temperature probe positioned in the tundish 604. Although the temperature probe 100 depicted in FIG. 6 includes an IR-transparent oxide rod 302 that does not extend beyond the wall of the tundish 604, it is to be understood that any of the embodiments described herein may be used in connection with a tundish and/or a ladle.

It should now be understood that the temperature probe devices described herein may provide protection to the IR sensor by including an IR-transparent refractory window or an IR-transparent oxide rod that seals the IR sensor from the channel of the sheath. Additionally, the temperature probe devices described herein may provide cost savings and a reduction in waste generated during each metallurgical cycle.

In a first aspect, the disclosure provides a device to measure a temperature of molten metal includes an infrared sensor effective to measure the temperature of the molten metal, a sheath having a sealed end, an open end, and a channel extending from the open end to the sealed end, and an infrared-transparent refractory window disposed between the infrared sensor and the channel of the sheath such that the infrared sensor can measure the temperature of an environment around the sheath through the window, the channel, and the sealed end. The open end of the sheath is proximately coupled to the infrared sensor and the sealed end of the sheath extends into the molten metal. The infrared-transparent refractory window seals the infrared sensor from the channel in the sheath.

In a second aspect, the disclosure provides the device of the first aspect wherein the infrared-transparent refractory window comprises alumina, sapphire, $Y_2O_3$, MgO, transparent spinel, aluminum oxynitride, fused silica, another oxide, a transparent ceramic, or a combination thereof.

In a third aspect, the disclosure provides the device of the first or second aspects wherein the sheath comprises alumina-graphite, silica, zirconia-graphite, silicon alumina nitride, other ceramic materials, or a mixture thereof.

In a fourth aspect, the disclosure provides the device of any of the first through third aspects further comprising a tube within the sheath, wherein the tube comprises mullite, alumina, or a mixture thereof.

In a fifth aspect, the disclosure provides the device of any of the first through fourth aspects wherein the infrared-transparent refractory window has a thickness from about 3 mm to about 12 mm.

In a sixth aspect, the disclosure provides the device of any of the first through fifth aspects wherein the infrared-transparent refractory window has a thickness of less than or equal to about 5 mm.

In a seventh aspect, the disclosure provides a device to measure a temperature of molten metal that includes an infrared sensor effective to measure the temperature of the molten metal, a sheath having a sealed end, an open end, and a channel extending from the open end to the sealed end, and an infrared-transparent oxide rod extending from the open end to the sealed end of the sheath inside the channel. The open end of the sheath is disposed near the infrared sensor and the sealed end of the sheath extends into the molten metal. The infrared-transparent oxide rod seals the infrared sensor from the channel of the sheath.

According to an eighth aspect, the disclosure provides the device of the seventh aspect, wherein the infrared-transparent oxide rod comprises alumina, sapphire, $Y_2O_3$, MgO, fused silica, fused quartz, another oxide, or a combination thereof.

According to a ninth aspect, the disclosure provides the device of the seventh or eighth aspects, wherein the infrared-transparent oxide rod comprises fused silica.

According to a tenth aspect, the disclosure provides the device of any of the seventh through ninth aspects wherein the sheath comprises alumina-graphite, silica, zirconia-graphite, silicon alumina nitride, other ceramic materials, or a mixture thereof.

According to an eleventh aspect, the disclosure provides the device of any of the seventh through tenth aspects wherein the infrared-transparent oxide rod has a diameter from about 0.5 mm to about 12 mm.

According to a twelfth aspect, the disclosure provides the device of any of the seventh through eleventh aspects wherein at least one end of the infrared-transparent oxide rod is fire polished or mechanically polished.

According to a thirteenth aspect, the disclosure provides the device of any of the seventh through twelfth aspects wherein the infrared-transparent oxide rod has a transmittance of greater than about 95% for a 10 mm thickness at a wavelength of about 1000 nm.

According to a fourteenth aspect, the disclosure provides the device of any of the seventh through thirteenth aspects wherein the infrared-transparent oxide rod has a length of about 18 inches or less.

According to a fifteenth aspect, the disclosure provides the device of any of the seventh through fourteenth aspects wherein the molten metal comprising molten steel, and wherein the infrared-transparent oxide rod comprises fused silica or fused quartz and does not extend past a working lining surface of a vessel containing the molten steel when the device is positioned through an aperture in a wall of the vessel.

According to a sixteenth aspect, the disclosure provides the device of any of the seventh through fifteenth aspects, the molten metal being non-ferrous, wherein the infrared-transparent oxide rod extends to an end of the channel proximate the sealed end of the sheath.

According to a seventeenth aspect, the disclosure provides a vessel for molten metal that includes a first opening for receiving molten metal into the vessel; a second opening for disbursing molten metal out of the vessel; a wall positioned between the first opening and the second opening, the wall including an aperture positioned near the second opening; and the device according to any of the first through sixteenth aspects.

According to an eighteenth aspect, the disclosure provides a vessel for molten metal that includes a first opening for receiving molten metal into the vessel; a second opening for disbursing molten metal out of the vessel; a wall positioned between the first opening and the second opening, the wall including an aperture positioned near the second opening; and a device positioned through the aperture in the wall. The device includes an infrared sensor; an alumina-graphite sheath having a sealed end, an open end, and a channel extending from the open end to the sealed end, the open end being disposed near the infrared sensor and the sealed end extending into the molten metal; and an infrared-transparent oxide rod comprising fused silica extending from the open end toward the sealed end of the sheath inside the channel. The infrared-transparent oxide rod seals the infrared sensor from the channel of the sheath.

According to a nineteenth aspect, the disclosure provides the vessel according to the seventeenth or eighteenth aspects, wherein the device further includes a tube extending from a first end of the channel proximate the sealed end of the sheath toward a second end of the channel proximate open end of the sheath, the tube having a sealed end positioned near the first end of the channel and an open end positioned near the second end of the channel, the tube being positioned at least partially between the infrared-transparent oxide rod and the channel.

According to a twentieth aspect, the disclosure provides the vessel according to any of the seventeenth through nineteenth aspects, wherein the infrared-transparent oxide rod has a diameter from about 0.5 mm to about 12 mm.

According to a twenty-first aspect, the disclosure provides the vessel according to any of the seventeenth through twentieth aspects, the molten metal comprising molten steel, wherein the infrared-transparent oxide rod does not extend past a working lining surface of the vessel containing the molten steel when the device is positioned through the aperture in the wall of the vessel.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A device to measure a temperature of molten metal comprising:
    an infrared sensor effective to measure the temperature of the molten metal;
    a sheath having a sealed end, an open end, and a channel extending from the open end to the sealed end, the open end being proximately coupled to the infrared sensor and the sealed end extending into the molten metal;
    an infrared-transparent refractory window disposed between the infrared sensor and the channel of the sheath such that the infrared sensor can measure the temperature of an environment around the sheath through the window, the channel, and the sealed end, wherein the infrared-transparent refractory window seals the infrared sensor from the channel in the sheath by sealing the open end of the sheath.

2. The device according to claim 1, wherein the infrared-transparent refractory window comprises alumina, sapphire, $Y_2O_3$, MgO, transparent spinel, aluminum oxynitride, fused silica, another oxide, a transparent ceramic, or a combination thereof.

3. The device according to claim 2, wherein the sheath comprises alumina-graphite, silica, zirconia-graphite, silicon alumina nitride, other ceramic materials, or a mixture thereof.

4. The device according to claim 2 further comprising a tube within the sheath, wherein the tube comprises mullite, alumina, or a mixture thereof.

5. The device according to claim 1, wherein the infrared-transparent refractory window has a thickness from about 3 mm to about 12 mm.

6. The device according to claim 1, wherein the infrared-transparent refractory window has a thickness of less than or equal to about 5 mm.

7. A device to measure a temperature of molten metal comprising:
    an infrared sensor effective to measure the temperature of the molten metal;
    a sheath having a sealed end, an open end, and a channel extending from the open end to the sealed end, the open end being disposed near the infrared sensor and the sealed end extending into the molten metal;
    an infrared-transparent oxide rod extending from the open end to the sealed end of the sheath inside the channel;
    wherein the infrared-transparent oxide rod seals the infrared sensor from the channel of the sheath by sealing the open end of the sheath.

8. The device according to claim 7, wherein the infrared-transparent oxide rod comprises alumina, sapphire, $Y_2O_3$, MgO, fused silica, fused quartz, another oxide, or a combination thereof.

9. The device according to claim 8, wherein the infrared-transparent oxide rod comprises fused silica.

10. The device according to claim 8, wherein the sheath comprises alumina-graphite, silica, zirconia-graphite, silicon alumina nitride, other ceramic materials, or a mixture thereof.

11. The device according to claim 7, wherein the infrared-transparent oxide rod has a diameter from about 0.5 mm to about 12 mm.

12. The device according to claim 7, wherein at least one end of the infrared-transparent oxide rod is fire polished or mechanically polished.

13. The device according to claim 7, wherein the infrared-transparent oxide rod has a transmittance of greater than about 95% for a 10 mm thickness at a wavelength of about 1000 nm.

14. The device according to claim 7, wherein the infrared-transparent oxide rod has a length of about 18 inches or less.

15. The device according to claim 14, the molten metal comprising molten steel, wherein the infrared-transparent oxide rod comprises fused silica or fused quartz and does not extend past a working lining surface of a vessel containing the molten steel when the device is positioned through an aperture in a wall of the vessel.

16. A vessel for molten metal comprising:
a first opening for receiving molten metal into the vessel;
a second opening for disbursing molten metal out of the vessel;
a wall positioned between the first opening and the second opening, the wall including an aperture positioned near the second opening;
a device positioned through the aperture in the wall, the device comprising:
an infrared sensor;
an alumina-graphite sheath having a sealed end, an open end, and a channel extending from the open end to the sealed end, the open end being disposed near the infrared sensor and the sealed end extending into the molten metal; and
an infrared-transparent oxide rod comprising fused silica extending from the open end toward the sealed end of the sheath inside the channel;
wherein the infrared-transparent oxide rod seals the infrared sensor from the channel of the sheath by sealing the open end of the sheath.

17. The vessel of claim 16, wherein the device further comprises a tube extending from a first end of the channel proximate the sealed end of the sheath toward a second end of the channel proximate open end of the sheath, the tube having a sealed end positioned near the first end of the channel and an open end positioned near the second end of the channel, the tube being positioned at least partially between the infrared-transparent oxide rod and the channel.

18. The vessel of claim 17, wherein the infrared-transparent oxide rod has a diameter from about 0.5 mm to about 12 mm.

19. The vessel of claim 18, the molten metal comprising molten steel, wherein the infrared-transparent oxide rod does not extend past a working lining surface of the vessel containing the molten steel when the device is positioned through the aperture in the wall of the vessel.

* * * * *